July 9, 1940.                L. F. ATHY ET AL                2,207,280
                        METHOD OF ELECTRICAL LOGGING
                          Filed Feb. 3, 1938        5 Sheets-Sheet 3

INVENTORS
Lawrence F. Athy
Harold R. Prescott
BY
ATTORNEY

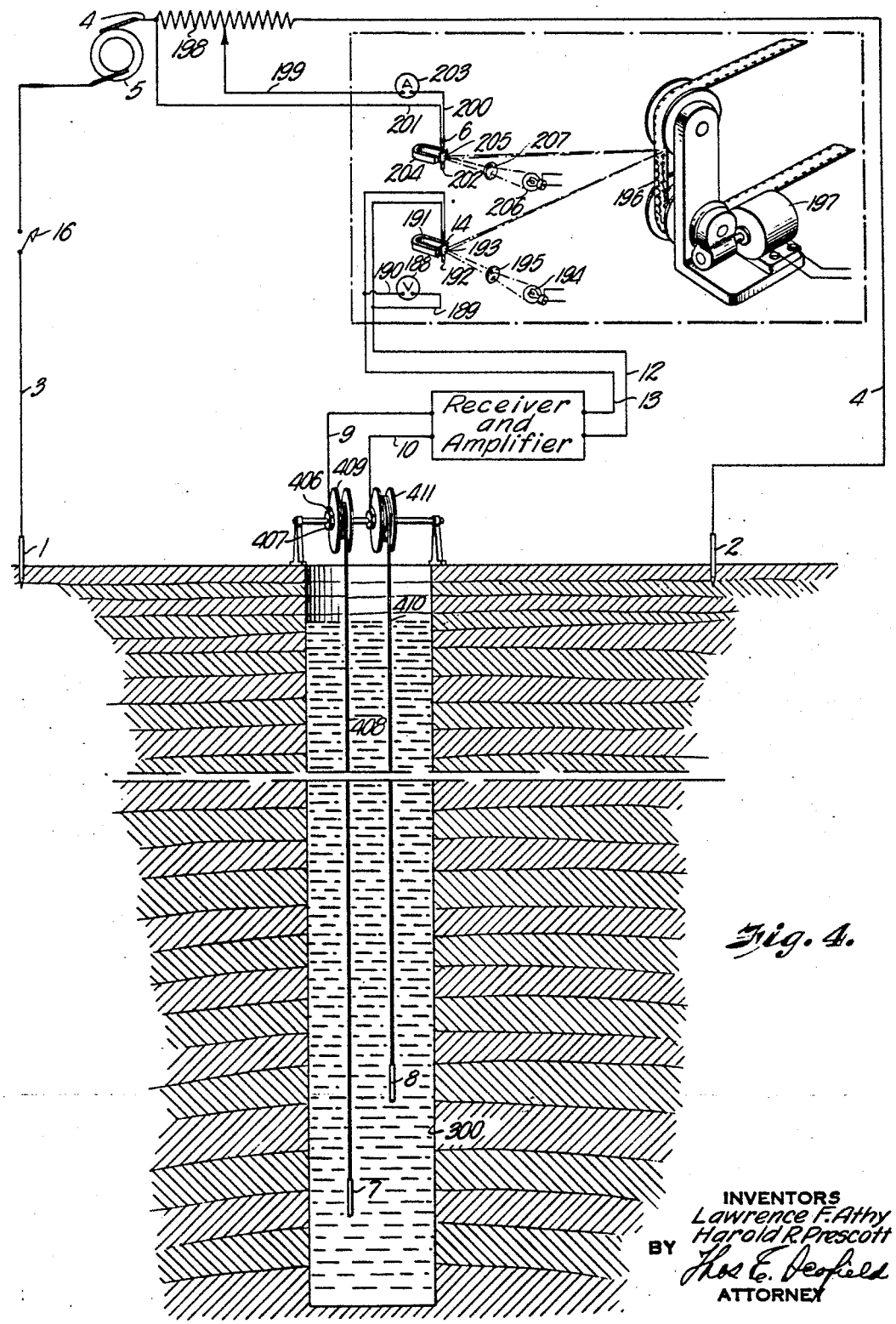

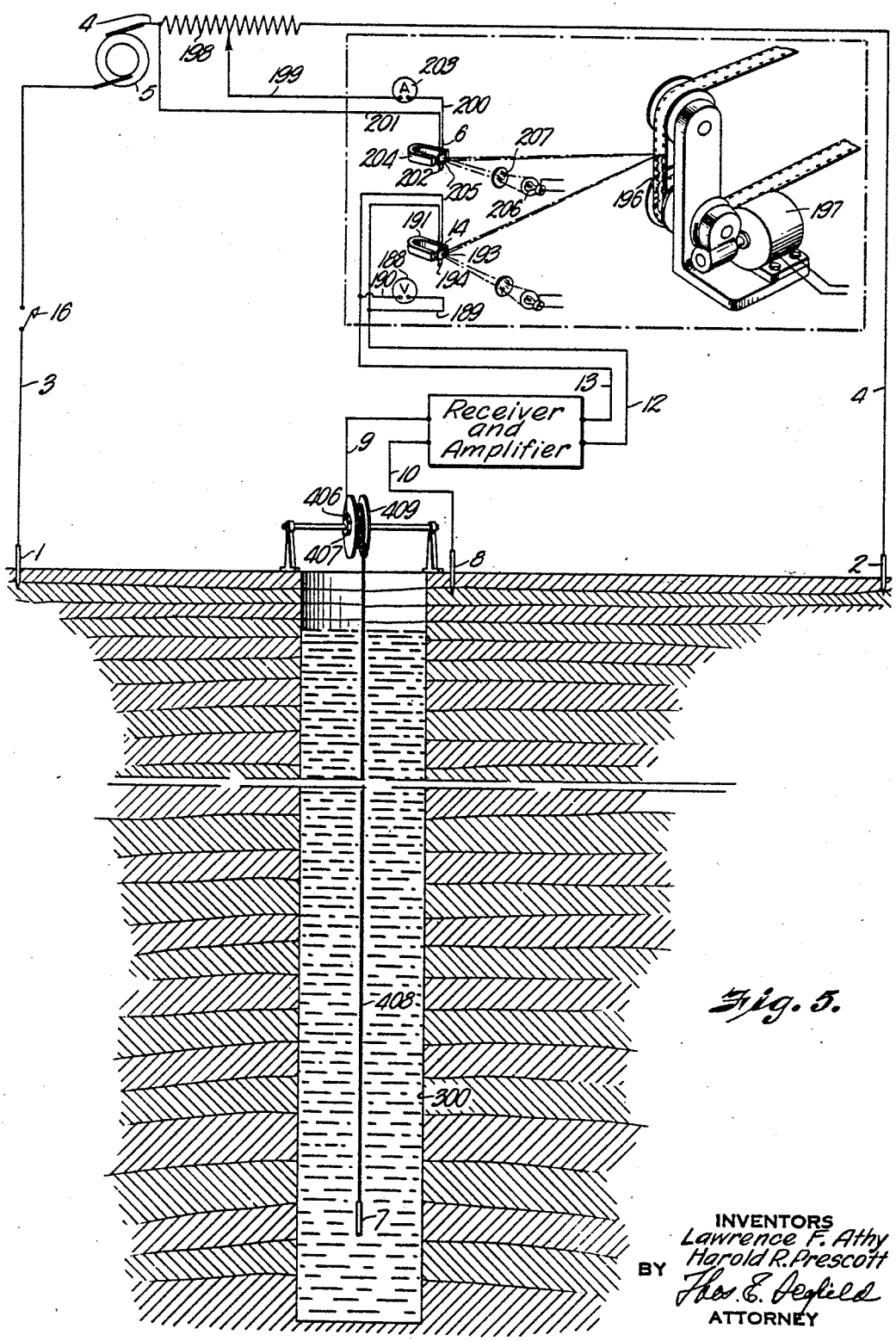

Patented July 9, 1940

2,207,280

UNITED STATES PATENT OFFICE 2,207,280

METHOD OF ELECTRICAL LOGGING

Lawrence F. Athy and Harold R. Prescott, Ponca City, Okla., assignors to Continental Oil Company, Ponca City, Okla., a corporation of Delaware Application February 3, 1938, Serial No. 188,489

10 Claims. (Cl. 175—182)

Our invention relates to a method of electrical logging, and more particularly to a method of electrical logging of a bore hole employing electrical resistivity methods.

In geological explorations, accurate knowledge of the various subsurface strata is obtained by taking cores by means of core drilling. A record or log is kept showing the different formations traversed. This is a tedious operation and sometimes inaccuracies result due to the difficulty of ascertaining exactly when one stratum has been left and another has been entered.

Where a drill hole is already in existence, it is frequently desirable to check the thicknesses of the various strata. Frequently valuable geological information may be obtained by correlating a plurality of spaced drill holes. For this work accurate knowledge of the depth and thicknesses of the various strata is essential.

The measurement of electrical specific resistivity of various rocks traversed inside of a drill hole at different depths is known to the art, and "electrical logs" are obtained showing the depth of the geological horizons and respective thicknesses of various strata.

In electrical methods of logging bore holes of the prior art, direct current or very low current has been chiefly used. High frequency currents do not penetrate through the earth for great distances, and low frequency currents are more suited for electrical methods of bore hole logging. Low frequency currents, however, introduce difficulties due to ground currents and magnetic storms. It has been suggested in order to overcome these difficulties to use high current values for short intervals of time. The use of high current densities, however, introduces a fresh difficulty. Various strata exhibit irreversible electrolytic effects even though alternating current or pulsating direct current is employed.

One object of our invention is to provide a method of electrical logging of bore holes which will enable the use of small current densities and small potentials while obtaining great accuracy in results.

Another object of our invention is to provide a method of electrical logging of bore holes employing a low fixed frequency, the apparatus being such that it is non-responsive to frequencies higher than the fixed frequency or to frequencies lower than the fixed frequency.

A further object of our invention is to provide a method and apparatus for electrical logging of bore holes which will be less susceptible to ground currents and magnetic storms.

Other and further objects of our invention will appear from the following description.

In the accompanying drawings which form part of the instant specification and are to be read in conjunction therewith, and in which like reference numerals are used to indicate like parts in the various views;

Fig. 4 is a diagrammatic view of another arrangement of apparatus capable of carrying out the method of our invention.

Fig. 5 is a diagrammatic view of still another arrangement of apparatus capable of carrying out the method of our invention.

Figure 1:
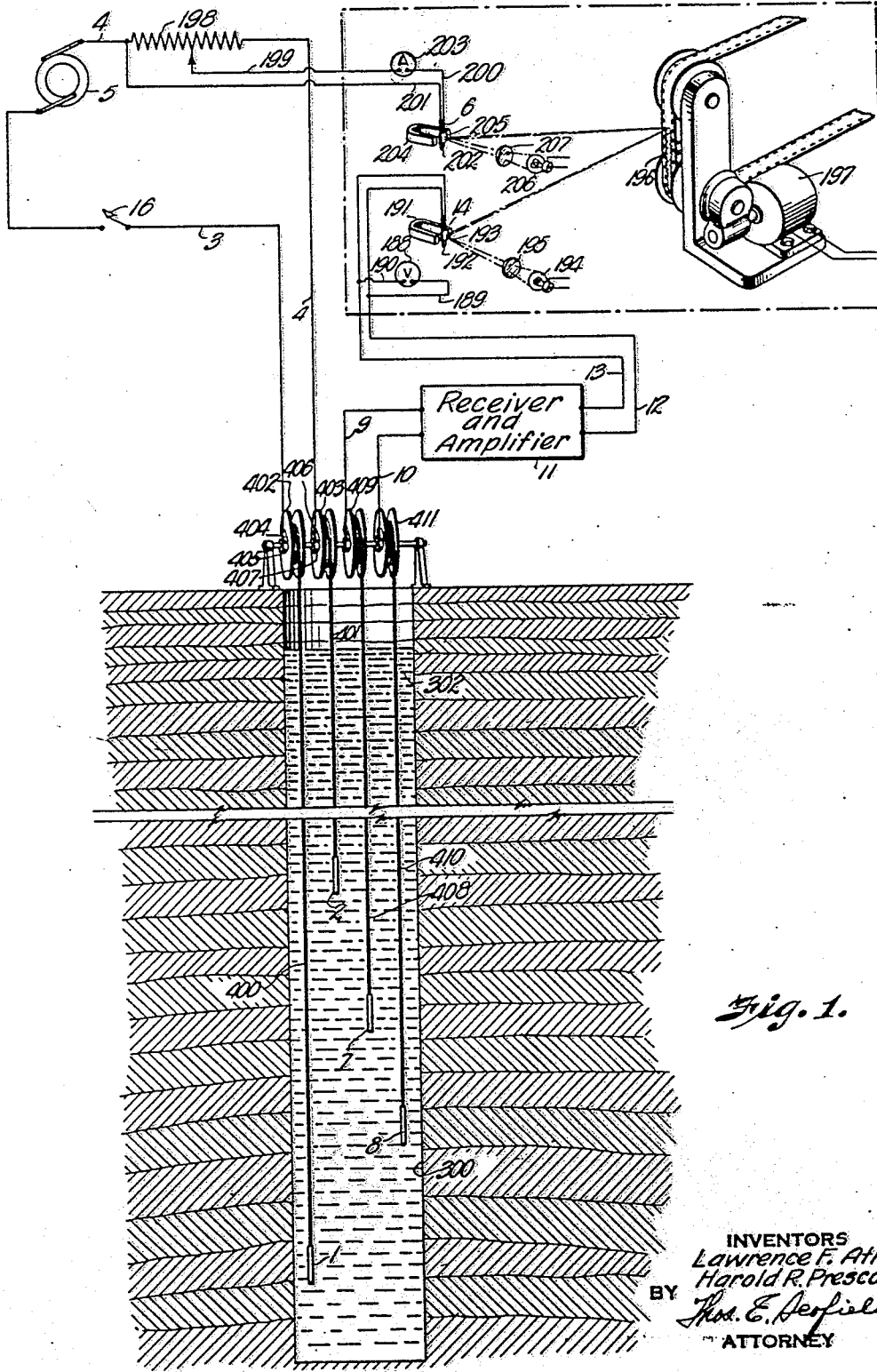
Fig. 1 is a diagrammatic view of apparatus capable of carrying out the method of our invention.

Referring now to Fig. 1, an alternator 5 is adapted to deliver alternating potential through conductors 3 and 4 to electrodes 1 and 2, lowered into a bore hole 300. Electrodes 1 and 2 are carried by flexible cables 400 and 401, normally housed on reels 402 and 403, current being supplied through brushes 404 and 406 and rings 405 and 407. It is understood that the bore hole 300 is filled with water or drilling mud 302, and that the key 16 is closed.

A galvanometer 6 is adapted to measure current flowing in the circuit. Lowered into the bore hole and positioned intermediate electrodes 1 and 2, are electrodes 7 and 8. The vertical spacing is such that the distance between electrodes 7 and 8 is one-third of the distance between electrodes 2 and 1, and the vertical distance between electrode 2 and electrode 7 is equal to the distance between electrode 8 and electrode 1. In other words, the distance between electrode 2 and electrode 7 is equal to the distance between electrode 7 and electrode 8, and this distance is equal to the distance between electrode 8 and electrode 1. Electrode 7 is carried by a flexible cable 408 housed upon a reel 409. Electrode 8 is carried by a flexible cable 410 housed upon a reel 411. Electrode 7 is electrically connected to conductor 9, and electrode 8 is electrically connected to conductor 10 by brushes and rings similar to brushes 404 and 406, and rings 405 and 407. Conductors 9 and 10 are connected to a receiver and amplifier shown diagrammatically at 11.

When current is impressed upon electrodes 1 and 2, an electric field is set up, the current flowing along all possible paths from one electrode to the other. An equi-potential plane may pass through the center of and perpendicular to the line joining the two electrodes. Such a plane partitions the earth into two similar halves each of which may be tested separately and thus compared with each other. Surrounding each electrode on either side of the central plane are infinite numbers of spheroidal equi-potential surfaces. The potential drop E between any one of these spheroids in the central plane is determined by the separation of two electrodes 1 and 2 and their distance from the central plane; the distance of the spheroid from the electrode and the central plane and the nature of the material lying between the spheroid and the central plane. Either of the particular spheroids under determination is determined by electrodes 7 and 8. If the distance between electrode 1 and electrode 8, and electrode 7 and electrode 2, be always kept equal to one-third of the distance between electrode 1 and electrode 2, then calling this distance $d$, then;

(1) $$E = \frac{I}{4\pi d} \cdot r$$

where $r$ is the average resistivity of the material between the spheroid in question and the central plane, and $I$ is the total current flowing in the circuit.

From this, transposing, one obtains;

(2) $$r = 4\pi d \frac{E}{I}$$

$d$ may be kept at a constant distance, K, measured in feet, and resistivity may be easily calculated from the following equation;

(3) $$r = 383 K \frac{E}{I}$$

The voltage E is measured by the potential difference across conductors 9 and 10. This potential difference is amplified by receiver and amplifier 11. The output of the amplifier is a function of the voltage received and is led by conductors 12 and 13 to an oscillograph or galvanometer shown diagrammatically at 14. The galvanometer 6 measures the value of I in the above equation.

Figure 6:
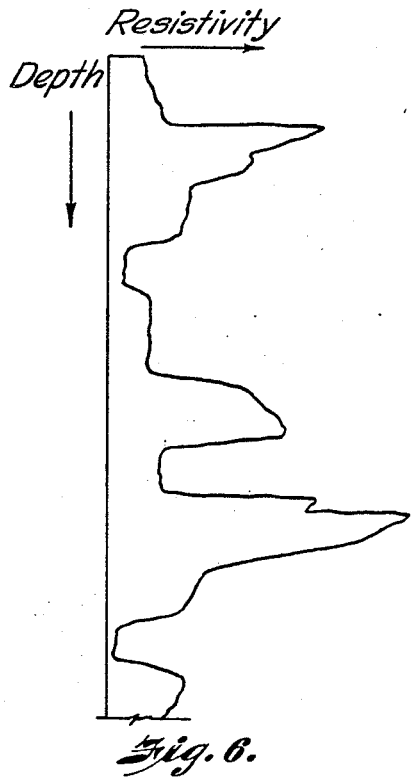
Fig. 6 is a plot or bore hole log of resistivity plotted against depth.

It will be apparent that values of $r$ may be obtained at various depths and a curve or plot of depth versus resistivity similar to that shown in Fig. 6 may be readily obtained.

A voltmeter 188 of any desired type such as a vacuum tube voltmeter is connected across output leads 12 and 13 by means of conductors 189 and 190. The oscillograph 14 may comprise a field magnet 191 and an oscillograph element 192 which is well damped so as to produce low frequencies faithfully in wave form and phase. A mirror 193 is carried by the oscillograph element 192. Light from an incandescent light 194 is projected by a lens 195 upon the mirror 193 for reflection upon a light sensitive medium 196 provided with any suitable means such as an electric motor 197 for moving the light sensitive medium past the light spot reflected by mirror 193.

A resistance 198 is placed in one of the output leads 4 leading to the electrode 2. The resistance is tapped by a variable arm 199. It will be readily apparent that leads 200 and 201 across the resistance 198 will reflect the current flowing from the current source 5. The oscillograph element 202 will measure the voltage across the resistance. Since the resistance is fixed, the voltage across the resistance will vary as a function of the current. A direct reading of the current may be made on an ammeter 203 which may be of any suitable type. The oscillograph element 202 is supported within the field of magnet 204, and carries a mirror 205 upon which light from an incandescent lamp 206 is projected by a lens 207. The mirror 205 reflects the light upon the sensitized film 196 in side by side relation with light beams from oscillograph element 192. The oscillograph elements 192 and 202 are quite high in natural frequency and for the frequencies recorded by them, may be regarded as practically without inertia.

Figures 7, 8:
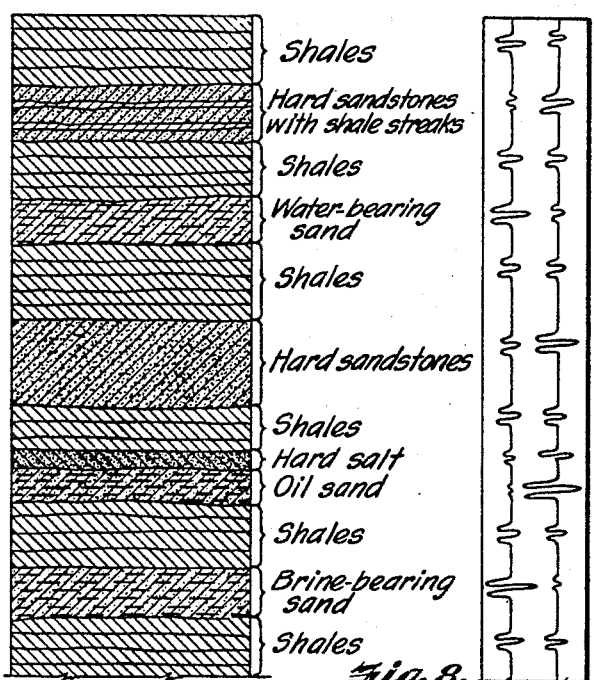
Fig. 7 is a sectional view of the formation producing the bore hole log shown in Fig. 6.
Fig. 8 is a diagrammatic view similar to Fig. 6 showing curves obtained by means of transient currents for the section shown in Fig. 7.

A key 16 is adapted to momentarily close the circuit in order to obtain transient effects which are recorded upon the sensitized medium 196, producing curves such as shown in Fig. 8. These curves may be positioned graphically corresponding to depth to produce a plot such as shown in Fig. 8. By "momentarily" is meant a short interval of time, not exceeding five seconds.

In bore hole measurements the close spacing of the electrodes give fairly large changes in measured quantities, and fairly accurate logs may be taken in uncased bore holes. In cased bore holes or where extreme accuracy is desired, it is impossible to obtain usable bore hole logs by ordinary methods. We have discovered that we may employ a low frequency current having a good wave form in which the transmitter employs a current of single frequency and a receiver is provided with a high pass filter and a low pass filter, enabling the rejection of currents higher in frequency than the exciting source and currents lower in frequency than the exciting source, followed by the amplification of the filtered current with its subsequent recording upon a record strip or by readings of the current flow and voltage employed from which resistivity may be plotted and recorded to obtain accurate readings in both cased and uncased bore holes.

By means of our method we obtain increased sensitivity, and at the same time polarizing, electrolytic and other stray electrical effects are minimized.

Figure 2:
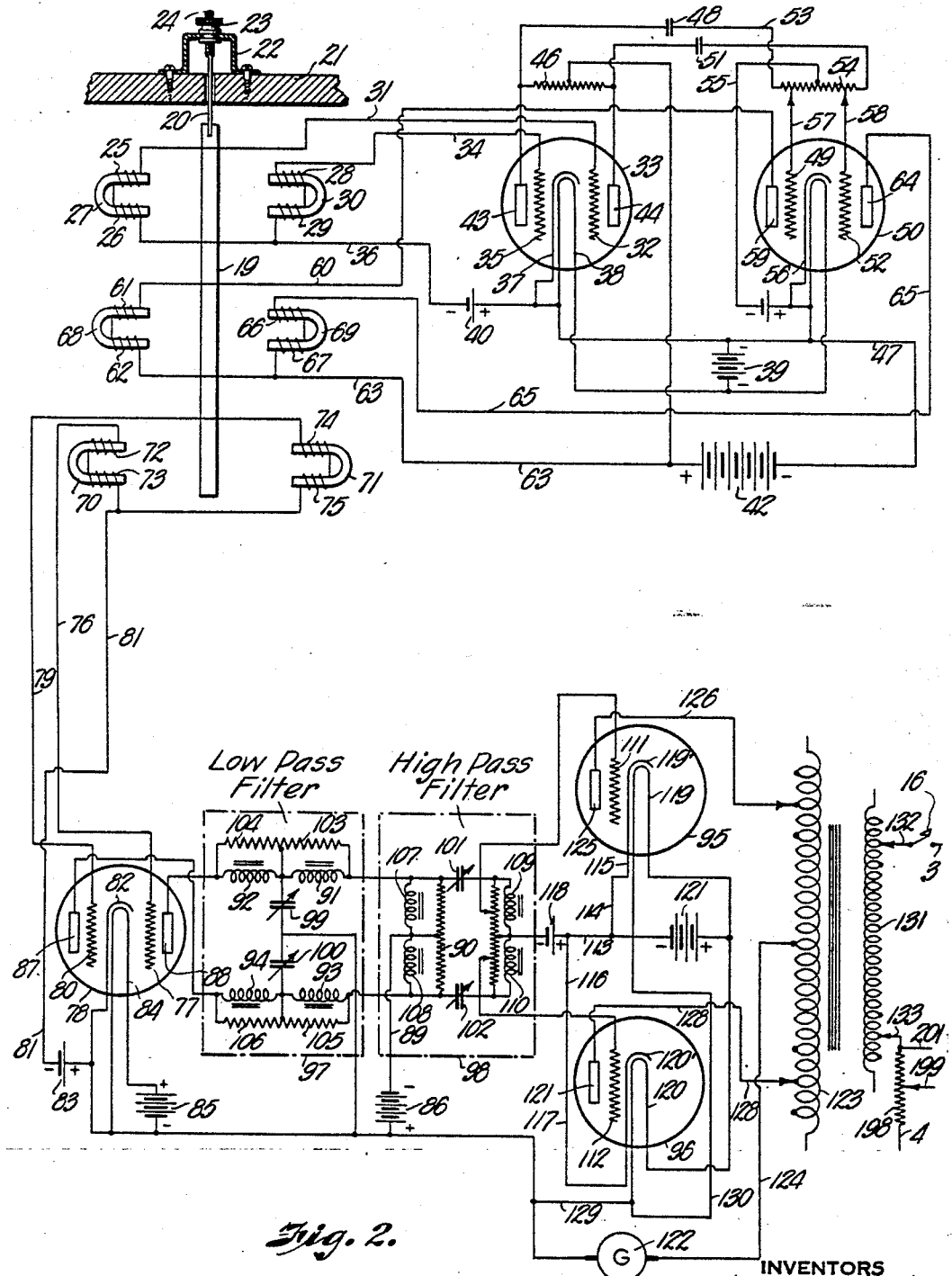
Fig. 2 is a schematic view showing the exciting source or alternator used in carying out the method of our invention.

The alternator shown diagrammatically at 5 is shown in detail in Fig. 2, it being understood that any suitable source known to the art of obtaining a low frequency current of a fixed frequency may be employed in carrying out the method of our invention.

The alternator shown in Fig. 2 is suitable for very low frequencies such as five cycles per second and at the same time may be employed for frequencies as high as five hundred cycles per second. A vibrating member 19 is carried by a flexible spring member 20 from any suitable support 21 by means of an adjusting arrangement 22. The natural frequency will be determined by the length and shape of the vibrating member 19 and by the length and stiffness of the flexible spring suspension 20. The length of the spring suspension 20 may be varied by adjusting nut 23, raising or lowering the member 19 by means of threaded member 24 as can readily be appreciated by reference to Fig. 2. Coils 25 and 26 are wound around a small permanent magnet 27. Coils 28 and 29 are wound around a small permanent magnet 30. The coils 25, 26, 28, and 29 are exciting coils which develop a voltage as the vibrating member 19 oscillates. This voltage is induced in the windings when the external field of the magnet is altered by the member 19 alternately coming closer and then farther away from the coils, it being understood, of course, that the member 19 is of magnetic material or a member carrying pieces of magnetic material attached to the sides, which magnetic material is adapted to alter the external field of the small magnets 27 and 30. The voltage induced in the exciting coils 25 and 26 is led by conductor 31 to one grid 32 of a thermionic tube 33. The voltage induced in coils 28 and 29 is impressed by conductor 34 upon the grid 35 of the thermionic tube 33, the return portion of the circuits being comprised by conductor 36 which is connected to the cathode 37 of the tube 33. The cathode 37 is heated by a filament heater 38 to which current is supplied from a battery 39. A battery 40 furnishes bias voltage for the grid. A battery 42 supplies positive potential to the plates 43 and 44 of the tube 33, through a conductor 45 and center tapped resistance 46, the return in the plate circuit being from the negative terminal of the battery 42 through conductor 47 to cathode 37. Plate 43 is coupled by condenser 48 to the grid 49 of thermionic tube 50. Plate 44 is coupled by condenser 51 to the grid 52 of the tube 50. The other side of condenser 48 is connected by conductor 53 to one end of a resistance 54. The other side of condenser 51 is connected to the opposite end of the resistance 54. The resistance 54 is center tapped by a conductor 55 connected to cathode 56 of tube 50. Conductor 57 adjustably connects grid 49 to the resistance 54, while conductor 58 adjustably connects grid 52 to the resistance 54. The adjustment of conductors 57 and 58 controls the output of tube 50 acting as a volume control. The plate 59 of the tube 50 is connected to the positive terminal of battery 42 through conductor 60, windings 61 and 62, and conductor 63. The plate 64 of the tube 50 is connected to the positive terminal of battery 42 by conductor 65, windings 66 and 67, and conductor 63. The windings 61 and 62 are about a soft iron electromagnet core 68. The windings 66 and 67 are about a soft iron electromagnet core 69. The windings 61, 62, 66 and 67 are driving windings. The output of tube 50 is controlled to supply sufficient energy to keep the member 19 in oscillation. The driving electromagnets 68 and 69 are positioned as far as possible on each side of oscillating member 19 and still maintain oscillation. This reduces damping caused by residual magnetism of the cores and allows member 19 to oscillate as freely as possible. The amplitude of motion of vibrating member 19 is quite low in order that the motion may be as free of harmonics as possible. Mounted on each side of oscillating member 19 are small permanent magnets 70 and 71. Windings 72 and 73 are disposed about the poles of magnet 70. Windings 74 and 75 are disposed about the poles of magnet 71. As the member 19 of magnetic material vibrates, driven by driving electromagnets, as described above, it will alternately approach and recede from each of the small permanent magnets 70 and 71, varying the external magnetic field and inducing voltages in the windings 72 and 73, and 74 and 75. The pickup windings 72, 73, 74 and 75 are well separated from the vibrating member 19, are balanced and adjusted to have as nearly as possible a linear relationship between changes in the external flux of the small magnets with changes in the position of the vibrating member 19. This will give induced electrical voltages substantially as free of harmonics as the motion of vibrating member 19. The voltages induced in windings 72 and 73 are impressed by conductor 76 upon one grid 77 of thermionic tube 78. The voltages induced in windings 74 and 75 are impressed by conductor 79 upon another grid 80 of the tube 78, the return circuits being completed by conductor 81 to cathode 82 of tube 78. The grid is biased by a "C" battery 83. The cathode is provided with a filament heater 84 to which current is supplied from a "A" battery 85. Positive potential from "B" battery 86 is supplied to the plates 87 and 88 of the tube 78 through conductor 89, center tapped resistance 90 and respective groups of choke coils 91, 92, and 93, 94, as can readily be seen by reference to Fig. 2. The thermionic tube 78 will amplify the induced voltages generated in windings 72, 73, and 74, 75. The amplified voltage is passed to thermionic tubes 95 and 96 for further amplification through a low pass filter 97 and a high pass filter 98. The condensers 99 and 100 of the low pass filter are set to reject frequencies higher than the fundamental of the vibrating member 19. The condensers 101 and 102 of the high pass filter are adjusted to reject frequencies lower than fundamental of vibrating member 19. In parallel with choke coil reactances 91 and 92 of the low pass filter are resistances 103 and 104. In parallel with choke coil reactances 93 and 94 are resistances 105 and 106. Resistances are also placed in parallel with each choke coil reactance 107, 108, 109, and 110 of the high pass filter 98. These inductances 107, 108, 109 and 110 must be quite large in order to provide a peak response at the low frequencies used. The resistances are of such value that the net work is well damped in order that electrical oscillations will not be generated, enabling the natural frequency of the vibrating member 19 to be reproduced faithfully in wave form. In this connection, it is unimportant whether or not phase change occurs.

The output of the high pass filter is impressed upon the grids 111 and 112 of tubes 95 and 96, the return circuits being completed through common conductor 113 and conductor 114 to cathode 115 of tube 95 and conductor 116 to cathode 117 of tube 96, a biasing "C" battery 118 being provided. The tubes 95 and 96 are of the indirectly heated cathode type and are provided with filament heaters 119 and 120, respectively, which are supplied energy from an "A" battery 121. "B" power is supplied to the plate circuits of tubes 95 and 96 by a generator 122. The output of tubes 95 and 96 is connected to the primary winding 123 of the transformer, the power being supplied through conductor 124 to a center tap of the primary 123. Plate 125 of tube 95 is adjustably connected by conductor 126 to taps at one end of the primary 123. Plate 127 of tube 96 is adjustably connected by conductor 128 to taps at the other side of primary 123. The other side of the generator 122 is connected to cathodes 119' and 120' by conductor 129, the cathodes being interconnected by conductor 130.

The transformer of which winding 123 is the primary must be made with good iron and a high primary inductance in order to efficiently deliver energy at the low frequencies desired and in order to be as free of harmonics as possible. The secondary winding 131 is adapted to conduct the output energy of the alternator to the electrodes 1 and 2 through conductors 3 and 4. The conductors are connected to the secondary winding 131 of the transformer by adjustable connections 132 and 133. It is desirable to have these connections adjustable in order to properly match the impedance of the load circuit to the impedance of the plate circuits of tubes 95 and 96.

For higher frequencies, the spring 20 may be discarded and the vibrating member 19 may be clamped in the mounting or a tuning fork may be used as the vibrating member. When higher frequencies are used, the harmonics are less and the low pass filter and the high pass filter may be eliminated.

As mentioned hereinbefore, there are other sources of alternating current with fairly good wave form known to the art which may be used. The well known beat oscillators using push-pull detection and push-pull amplification can be designed to have a very low harmonic content to frequencies as low as fifteen or ten cycles per second if the circuits are well separated by buffer stages. Buffer stages can be used in connection with the alternator shown in Fig. 2 where the load delivered by the power stage is great. In this case, a buffer stage will be placed between the thermionic tube 78 and the output tubes 95 and 96.

The above variations are known to the art and may be used in carrying out the method of our invention.

Figure 3:
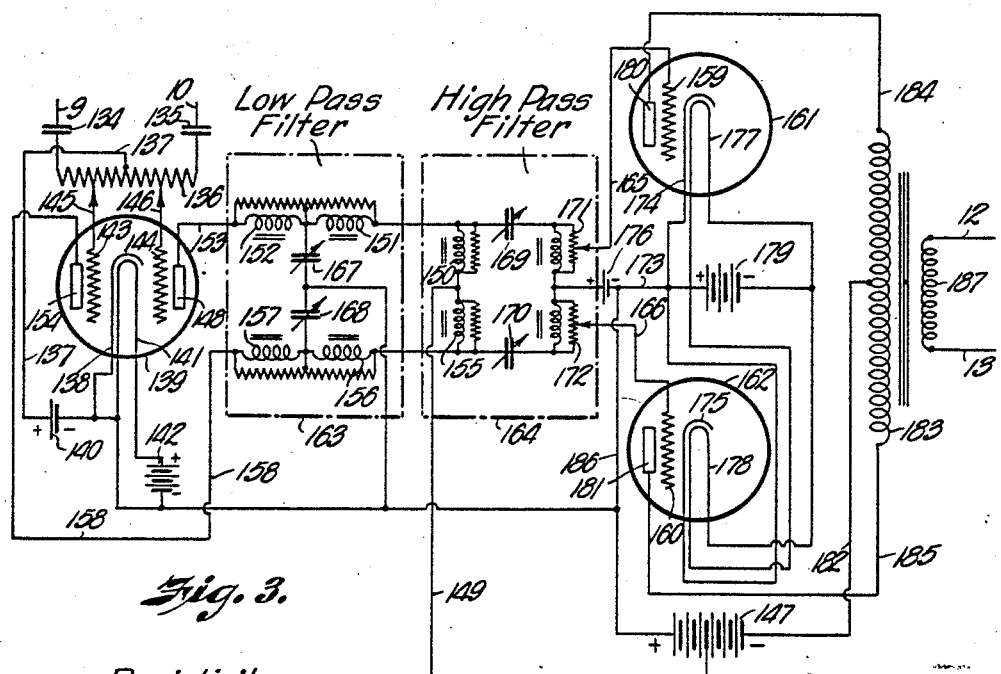
Fig. 3 is a diagrammatic view of a receiver and amplifier capable of carrying out the method of our invention.

The filtered low frequency potential is impressed by conductors 3 and 4 upon current electrodes 1 and 2. The key 16 may be closed and continuous current passed for a sufficient time to enable readings of the current and voltage to be taken. The voltage received is picked up from current electrodes 7 and 8 and carried by conductors 9 and 10 to a receiver and amplifier which is shown in Fig. 3. The potential is received through condensers 134 and 135 and impressed at the ends of a resistance 136. The resistance 136 is center tapped by a conductor 137 which is connected to the cathode 138 of a thermionic tube 139, the usual "C" battery 140 being used to bias the grid. The cathode 138 is provided with a filament heater 141 to which energy is supplied by means of an "A" battery 142. The grids 143 and 144 of the tube 139 are connected to the resistance 136 by adjustable conductors 145 and 146. The adjustment of these conductors acts as a volume control and varies the potential impressed upon the grids 143 and 144. Voltage from "B" battery 147 is impressed upon plate 148 of tube 139 through conductor 149, reactance 150, reactance 151, reactance 152 and conductor 153. Voltage from the "B" battery 147 is impressed upon the plate 154 through conductor 149, reactance 155, reactance 156, reactance 157 and conductor 158. The output of thermionic tube 139 is impressed upon the grids 159 and 160 of tubes 161 and 162 through a low pass filter 163 and a high pass filter 164 through conductors 165 and 166.

The condensers 167 and 168 of the low pass filter are set to reject frequencies higher than the frequency selected to be impressed upon the current electrodes. The condensers 169 and 170 of the high pass filter are set to reject frequencies lower than the source frequency. It will be noted that each of the reactances in both filters is provided with resistances connected in parallel therewith to provide electrical damping of the entire network enabling the reproduction of the fundamental frequency of the source faithfully. It will be noted that conductors 165 and 166 connecting the output of the high pass filter to the respective grids 159 and 160 may be adjusted upon the resistances 171 and 172 to act as a further means for controlling the overall amplification. By means of the filters, the amplifier delivers a reproduction of the potential at the potential electrodes with stray effects such as ground currents, electrolytic effects and variable resistance at the electrode conductors materially suppressed.

It will be clear to those skilled in the art that lower current densities may be employed for bore hole logging and that accuracy is materially increased. The records produced are materially clarified and camouflaging effects are minimized. The grids 159 and 160 return circuits are completed through conductors 173 and respective cathodes 174 and 175, a customary "C" biasing battery 176 being provided. Filament heater 177 of tube 161 and filament heater 178 of tube 162 are supplied current by "A" battery 179. Plate 180 of tube 161 and plate 181 of tube 162 are connected to the positive terminal "B" battery 147 through conductor 182 which is connected to a center tap of the primary 183 of the output transformer. The opposite ends of the primary winding 183 are connected respectively by conductors 184 and 185 to plates 180 and 181 of tubes 161 and 162, and the plate circuit is completed through respective cathodes 174 and 175 through conductor 186 to the negative terminal of the "B" battery 147. The secondary winding 187 of the output transformer impresses the voltage received through conductors 12 and 13 upon a measuring device such as an oscillograph, vacuum tube voltmeter or other means.

It will be understood that it is normally desirable to make measurements in terms of known quantities. This can be easily accomplished by calibrating the amplifier with its measuring means at the time of field use. By connecting the input leads 9 and 10 of the amplifier to a source of known voltage, the volume control connections 145 and 146, and 171 and 172 may be adjusted to give the desired overall sensitivity.

Referring now to Fig. 4 it will be observed that electrodes 1 and 2 are removed from the bore hole 300 and placed in contact with the ground. Electrodes 7 and 8 are lowered into the bore hole. As the electrodes 7 and 8 when lowered pass strata of different conductivity, the distortion of the potential surfaces surrounding the current electrodes 1 and 2 will be indicated by changing potential drop across the potential electrodes 7 and 8. The variations so obtained will, of course, not be as direct a measurement of resistivity of the material surrounding the bore hole as in the case of the arrangement and method shown in Fig. 1, but is valuable in many circumstances and furnishes a simpler system with two of the current electrodes not in the hole, thus eliminating their reels and cables. In this method actual resistivities need not be calculated, as resistivities will vary as a function of the potential drop across electrodes 7 and 8 with respect to the current input. For example, if the current input is kept constant, variations in potential drop between electrodes 7 and 8 will vary as a function of resistivity and the curve obtained of variations in resistivity will be a valuable index and will serve almost as well as the faithful calculation of resistivities.

Referring now to Fig. 5, a further simplification is shown. In this modification not only electrodes 1 and 2 are placed in contact with the ground at the surface, but also electrode 8 is so placed, leaving only electrode 7 to be lowered into the bore hole. In this case, as in the case of the embodiment shown in Fig. 4, as the electrode 7 passes strata of different conductivity the distortion of the potential surfaces surrounding the current electrodes will be indicated by the changing potential drop across electrodes 7 and 8, and here again actual resistivities need not be calculated as these will vary as a function of the potential drop. It is true that the potential drop will also vary as the distance between electrodes 7 and 8, but here again the curve will indicate variations in the resistivity which may be employed for purposes of comparison and may be used for co-relating a plurality of bore holes in a given area of similar structure.

It will be observed that we have accomplished the objects of our invention. We are enabled to produce bore hole logs by electrical methods of great accuracy, masking effects of electrical storms, electrolytic effects of various strata, polarizing effects and other stray electrical effects are materially lessened. Due to the fact that we may employ the voltage received greatly due to our method of using filtered alternating current, we may employ smaller equipment. This renders the equipment more readily portable enabling explorations to be made in areas which otherwise might not be susceptible to exploration.

The transient method of making bore hole logs, as when key 16 is momentarily closed, may be employed as a check. Frequently geological horizons have peculiar characteristics resulting in rapid damping of the transients. Other horizons have different damping characteristics. The peculiarities in amplitude, damping and phase change furnish further markers enabling identifications of the respective horizons.

Frequencies as low as five cycles per second and as high as five hundred cycles per second may be employed, depending upon the localities in which observations are made. A plurality of various frequencies may be tried in a locality to determine that with which best results are obtained, and these frequencies may be employed in that particular locality. By means of our method a low frequency exciting source is possible. This has not heretofore been accomplished because of the masking effects hereinbefore pointed out.

It will be understood that certain features and sub-combinations are of utility and may be employed without reference to other features of sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of logging bore holes including the steps of passing an alternating current of predetermined frequency through the earth between two separated points adjacent the surface of the earth, receiving the potential difference between a point adjacent the earth's surface lying between said current source points and a point within a bore hole, rejecting alternating potentials higher in frequency than the predetermined frequency, and measuring the remaining potential difference.

2. A method of logging bore holes including the steps of passing an alternating current of predetermined frequency through the earth between two separated points adjacent the surface of the earth, receiving the potential difference between a point adjacent the earth's surface lying between said current source points and a point within a bore hole, rejecting alternating potentials lower in frequency than the predetermined frequency, and measuring the remaining potential difference.

3. A method of logging bore holes including the steps of passing an alternating current of predetermined frequency through the earth between two separated points adjacent the surface of the earth, receiving the potential difference between a point adjacent the earth's surface lying between said current source points and a point within a bore hole, rejecting alternating potentials higher in frequency than the predetermined frequency, rejecting potentials lower in frequency than the predetermined frequency, and measuring the remaining potential difference.

4. A method of logging bore holes including the steps of passing an alternating current of predetermined frequency through the earth between two separate points adjacent the surface of the earth positioned on opposite sides of a bore hole, receiving potential differences between two points within said bore hole, rejecting alternating potentials higher in frequency than the predetermined frequency and measuring the remaining potential difference.

5. A method of logging bore holes including the steps of passing an alternating current of predetermined frequency through the earth between two separate points adjacent the surface of the earth positioned on opposite sides of a bore hole, receiving potential differences between two points within said bore hole, rejecting alternating potentials lower in frequency than the predetermined frequency and measuring the remaining potential difference.

6. A method of logging bore holes including the steps of passing an alternating current of predetermined frequency through the earth between two separate points adjacent the surface of the earth positioned on opposite sides of a bore hole, receiving potential differences between two points within said bore hole, rejecting alternating potentials higher in frequency than the predetermined frequency, rejecting alternating potentials lower in frequency than the predetermined frequency, and measuring the remaining potential difference.

7. A method of logging bore holes including the steps of passing an alternating current of predetermined frequency between two separated points lying within a bore hole, receiving potential difference between two points within said bore hole lying between said current source points, rejecting alternating potentials higher in frequency than the predetermined frequency, and measuring the remaining potential difference.

8. A method of logging bore holes including the steps of passing an alternating current of predetermined frequency between two separated points lying within a bore hole, receiving potential difference between two points within said bore hole lying between said current source points, rejecting alternating potentials lower in frequency than the predetermined frequency, and measuring the remaining potential difference.

9. A method of logging bore holes including the steps of passing an alternating current of predetermined frequency between two separated points lying within a bore hole, receiving potential difference between two points within said bore hole lying between said current source points, rejecting alternating potentials higher in frequency than the predetermined frequency, rejecting alternating potentials lower in frequency than the predetermined frequency, and measuring the remaining potential difference.

10. A method of logging bore holes including the steps of passing an alternating current of predetermined low frequency through a bore hole, receiving potential differences between two points within said bore hole, rejecting alternating potentials higher in frequency than the predetermined frequency, rejecting alternating potentials lower in frequency than the predetermined frequency, and measuring the remaining potential difference.

LAWRENCE F. ATHY.
HAROLD R. PRESCOTT.